United States Patent
Scherzinger et al.

(10) Patent No.: US 9,317,374 B2
(45) Date of Patent: *Apr. 19, 2016

(54) PERFORMING A BACKGROUND COPY PROCESS DURING A BACKUP OPERATION

(71) Applicant: International Business Machines Corporation, Armonk, NY (US)

(72) Inventors: Stefanie Scherzinger, Regensburg (DE); Andreas Trinks, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,003

(22) Filed: Mar. 13, 2015

(65) Prior Publication Data

US 2015/0186218 A1 Jul. 2, 2015

Related U.S. Application Data

(63) Continuation of application No. 13/198,575, filed on Aug. 4, 2011, now Pat. No. 9,015,119.

(30) Foreign Application Priority Data

Oct. 26, 2010 (EP) .................................. 10188910

(51) Int. Cl.
  *G06F 17/30* (2006.01)
  *G06F 11/14* (2006.01)
  *H04L 12/26* (2006.01)

(52) U.S. Cl.
  CPC ........ *G06F 11/1448* (2013.01); *G06F 11/1461* (2013.01); *G06F 11/1466* (2013.01); *H04L 43/08* (2013.01); *G06F 2201/80* (2013.01)

(58) Field of Classification Search
  USPC .......... 707/610, 619, 634, 638, 640, 644, 654
  See application file for complete search history.

(56) References Cited

U.S. PATENT DOCUMENTS

| | | | |
|---|---|---|---|
| 5,522,037 A | 5/1996 | Kitagawa et al. | |
| 5,938,723 A | 8/1999 | Hales, II et al. | |
| 6,131,148 A * | 10/2000 | West et al. | 711/162 |
| 6,263,454 B1 | 7/2001 | Gold et al. | |
| 7,089,383 B2 * | 8/2006 | Ji et al. | 711/162 |
| 7,096,248 B2 | 8/2006 | Masters et al. | |

(Continued)

OTHER PUBLICATIONS

Scherzinger eal., U.S. Appl. No. 13/198,575, filed Aug. 4, 2011.

(Continued)

*Primary Examiner* — Hanh Thai
(74) *Attorney, Agent, or Firm* — Zilka-Kotab, PC

(57) ABSTRACT

A method according to one embodiment includes receiving information from a performance monitoring facility of a database at a data protection manager implemented at least in part in hardware, wherein the performance monitoring facility is configured to measure performance of the database, wherein the data protection manager is configured to control a backup operation of the database on a storage subsystem. The backup operation is started, and the performance monitoring facility is informed about the starting of the backup operation. In response to receiving an indication that a predefined performance criterion has been violated, information from the performance monitoring facility is received at the data protection manager, the data protection manager causing compliance with the predefined performance criterion in response to the information.

20 Claims, 3 Drawing Sheets

(56) References Cited

U.S. PATENT DOCUMENTS

| | | | |
|---|---|---|---|
| 7,185,192 B1* | 2/2007 | Kahn | 713/155 |
| 7,343,356 B2* | 3/2008 | Prahlad | G06F 3/0605 705/400 |
| 7,343,459 B2* | 3/2008 | Prahlad | G06F 3/0605 707/999.202 |
| 7,346,751 B2* | 3/2008 | Prahlad | G06F 3/0605 711/117 |
| 7,363,359 B1 | 4/2008 | Tripathy et al. | |
| 7,373,451 B2 | 5/2008 | Lam et al. | |
| 7,467,268 B2 | 12/2008 | Lindemann et al. | |
| 7,617,260 B2 | 11/2009 | Augenstein et al. | |
| 7,644,245 B2* | 1/2010 | Prahlad | G06F 3/0605 711/117 |
| 7,707,186 B2 | 4/2010 | LeCrone et al. | |
| 7,716,672 B2 | 5/2010 | Douceur et al. | |
| 7,765,167 B2* | 7/2010 | Prahlad | G06F 3/0605 705/400 |
| 7,778,960 B1 | 8/2010 | Chatterjee et al. | |
| 7,809,688 B2 | 10/2010 | Cisler et al. | |
| 7,865,470 B2 | 1/2011 | Fries et al. | |
| 7,933,932 B2 | 4/2011 | Singh | |
| 7,949,687 B1 | 5/2011 | Sinclair | |
| 8,046,551 B1 | 10/2011 | Sahin | |
| 8,145,601 B2 | 3/2012 | Zizys et al. | |
| 8,306,926 B2* | 11/2012 | Prahlad | G06F 3/0605 705/400 |
| 8,347,137 B1 | 1/2013 | Chepel et al. | |
| 8,359,112 B2 | 1/2013 | Kephart et al. | |
| 8,380,674 B1 | 2/2013 | Bolen et al. | |
| 8,539,066 B1 | 9/2013 | Vasudeva | |
| 8,560,787 B2 | 10/2013 | Hutchison et al. | |
| 9,015,119 B2 | 4/2015 | Scherzinger et al. | |
| 2003/0214913 A1 | 11/2003 | Kan et al. | |
| 2005/0065985 A1 | 3/2005 | Tummala et al. | |
| 2005/0154734 A1 | 7/2005 | Zucchini | |
| 2006/0015696 A1 | 1/2006 | Nguyen et al. | |
| 2006/0034167 A1 | 2/2006 | Grice et al. | |
| 2006/0106893 A1 | 5/2006 | Daniels et al. | |
| 2006/0168199 A1 | 7/2006 | Chagoly et al. | |
| 2007/0294312 A1 | 12/2007 | Seshadri et al. | |
| 2008/0034011 A1 | 2/2008 | Cisler et al. | |
| 2008/0281885 A1 | 11/2008 | Dussud | |
| 2009/0138467 A1 | 5/2009 | Hunur et al. | |
| 2009/0157768 A1 | 6/2009 | Ichikawa et al. | |
| 2009/0300633 A1 | 12/2009 | Altrichter et al. | |
| 2009/0307763 A1 | 12/2009 | Rawlins et al. | |
| 2010/0185875 A1 | 7/2010 | Mayer et al. | |
| 2010/0293112 A1* | 11/2010 | Prahlad | G06F 3/0605 705/418 |
| 2011/0060759 A1 | 3/2011 | Fienblit et al. | |
| 2011/0099266 A1 | 4/2011 | Calder et al. | |
| 2011/0197039 A1 | 8/2011 | Green et al. | |
| 2012/0101999 A1 | 4/2012 | Scherzinger et al. | |
| 2012/0278650 A1 | 11/2012 | Muralimanohar et al. | |
| 2014/0189432 A1* | 7/2014 | Gokhale et al. | 714/41 |

OTHER PUBLICATIONS

Non-Final Office Action from U.S. Appl. No. 13/198,575, dated Jun. 13, 2014.

Notice of Allowance from U.S. Appl. No. 13/198,575, dated Dec. 12, 2014.

* cited by examiner

PERFORMING A BACKGROUND COPY PROCESS DURING A BACKUP OPERATION

RELATED APPLICATIONS

This application is a continuation of U.S. patent application Ser. No. 13/198,575 filed Aug. 4, 2011, which is incorporated herein by reference. The present application claims priority from a patent application filed with the European Patent Office on Oct. 26, 2010 under application number 10188910.3, which is incorporated herein by reference.

BACKGROUND

This invention relates to database systems, and particularly to a method and a system for performing a background copy process during a backup operation.

Data protection functionality is not one of the core components of a database. Functions such as backup and restore are typically provided by additional utilities. In some cases these utilities can be third party products (compared to the database) or can be integrated as part of the database software. These tools are called data protection management (dpm).

These utilities provide functionality to perform consistent backups of the databases and providing the link between the database and the enterprise data backup and recovery servers.

Using these utilities database applications are aware whether a backup of the vital data is performed or not. In case of traditional backup methods via a local area network (LAN) or a storage area network (SAN), backups of the vital data may take a long period of time, e.g. up to several hours. The performance degradation of the database server and thus of the application above is considerable especially for heavily utilized databases.

Also data protection management tools exist which can use copy technologies of storage subsystems to protect vital data (backup/restore). Such a feature makes it possible to create, nearly instantaneously, point-in-time or snapshot copies of entire logical volumes or data sets. Point-in-time, or snapshot, may be best understood as the state of a system at a particular point in time. The term was coined as an analogy to that in photography. It can refer to an actual copy of the state of a system or to a capability provided by certain systems.

One such copy technology is FlashCopy, a brand name of International Business Machines (IBM). This is a feature supported on various IBM storage devices. A utility providing a similar function is branded as ShadowImage by Hitachi Data Systems. Using either utility, the copies are immediately available for both read and write access.

When data is protected using FlashCopy a volume copy of a source to a target volume is performed. This point-in-time copy is then typically made available on another computer system. From there the data is moved to the enterprise data backup and recovery software. The copy of the date is immediately available as soon as the mapping between the source and target volume has been created.

In an asynchronous process the data is then physically copied from the source to the target volume in a background copy process. Since the background copy process accesses the source disks where the actual vital production data resides, to physically copy this date to the target volume, performance degradation of the database occurs. This is considerably less than for traditional backup methods via LAN or SAN but can still be sensed in and impact especially heavily utilized databases.

A database uses utilities to protect its vital data via a data protection management utility. A utility providing data protection mechanisms is termed data protection management or dpm. There are also tools known for monitoring performance of a database. A utility measuring and/or monitoring performance of a database and processing these performance data are termed performance monitoring facility or pmf.

A Service Level Agreement or SLA is part of a service contract where the level of service is formally defined. In practice, the term SLA is sometimes used to refer to the contracted delivery time of the service or performance. By way of example, the performance characteristics can be defined for the database directly, e.g. a maximum input/output wait time. These characteristics can be measured, evaluated and violations reported or actively prevented. The database performance can be influenced by many reasons besides an ongoing background copy process, for instance by network problems, thrashing buffer pool and the like.

BRIEF SUMMARY

According to one embodiment, a method includes receiving information from a performance monitoring facility of a database at a data protection manager implemented at least in part in hardware, wherein the performance monitoring facility is configured to measure performance of the database, wherein the data protection manager is configured to control a backup operation of the database on a storage subsystem. The backup operation is started, and the performance monitoring facility is informed about the starting of the backup operation. In response to receiving an indication that a predefined performance criterion has been violated, information from the performance monitoring facility is received at the data protection manager, the data protection manager causing compliance with the predefined performance criterion in response to the information.

According to another embodiment, a computer program product includes a computer readable storage medium having program instructions embodied therewith, the program instructions being executable by a processor to cause the processor to: provide, by the processor, an interface between a performance monitoring facility of a database and a data protection manager, wherein the performance monitoring facility is configured to measure performance of the database and the data protection manager is configured to control a backup operation of the database on a storage subsystem. Program instructions are also executable by the processor to cause the processor to start, by the processor, the backup operation while informing the performance monitoring facility about the start of the backup operation, and send, by the processor, information from the performance monitoring facility to the data protection manager to cause compliance with a predefined performance criterion in response to determining that the predefined performance criterion being violated.

In another embodiment, a method includes sending information from a performance monitoring facility of a database to a data protection manager, wherein the performance monitoring facility is configured to measure performance of the database regularly and the data protection manager is configured to control a backup operation of the database on a storage subsystem. An indication is received at the performance monitoring facility about the starting of the backup operation. Performance of the database is evaluated to determine when a predefined performance criterion is violated. In response to determining that the predefined performance criterion is violated, information is sent from the performance monitoring facility to the data protection manager to cause compliance with the predefined performance criterion.

DETAILED DESCRIPTION

Figure 1:
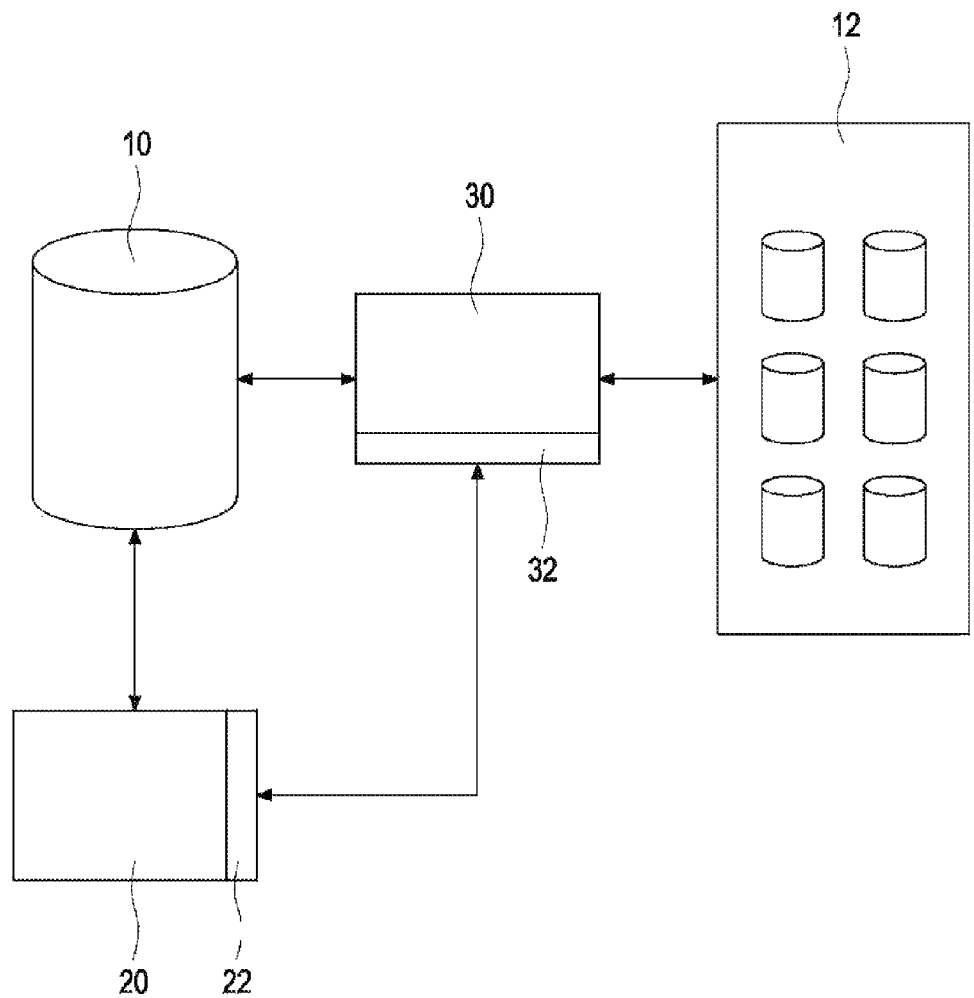
FIG. 1 shows a system with a database and a storage subsystem providing a data protection manager and a performance monitoring facility according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing a background copy process, particularly in the case of a backup of a database (backup operation), which may be regulated based on compliance with a predefined performance criterion, such as a Service Level Agreement, associated with a foreground process. Violation of the predefined performance criteria, in some approaches, may be corrected by tuning the background copy process accordingly, thereby ensuring consistent backup copies of the database and providing a link between the database and the enterprise data backup and recovery servers.

According to one general embodiment, a method includes providing an interface between a performance monitoring facility of a database and a data protection manager, wherein the performance monitoring facility is adapted for measuring performance of the database regularly and the data protection manager is adapted for controlling a backup operation of the database on a storage subsystem, starting the backup operation while informing the performance monitoring facility about the starting of the backup operation, continuously evaluating performance of the database to determine when a predefined performance criterion is violated, and in response to the predefined performance criterion being violated, sending information from the performance monitoring facility to the data protection manager to cause compliance with the predefined performance criterion.

According to another general embodiment, a computer program product includes a computer readable medium having computer readable program code therein, the computer readable program code being configured to: provide an interface between a performance monitoring facility of a database and a data protection manager, wherein the performance monitoring facility is adapted for measuring performance of the database regularly and the data protection manager is adapted for controlling a backup operation of the database on a storage subsystem; start the backup operation while informing the performance monitoring facility about the start of the backup operation and a start of a background copy process in the storage subsystem; continuously evaluate performance of the database to determine when a predefined performance criterion is violated, and send information from the performance monitoring facility to the data protection manager to cause compliance with the predefined performance criterion in response to the predefined performance criterion being violated.

In another general embodiment, a system includes a performance monitoring facility of a database adapted for measuring performance of the database regularly, a data protection manager for controlling a backup operation of the database on a storage subsystem, logic adapted for providing an interface between the performance monitoring facility of the database and the data protection manager, logic adapted for starting the backup operation while informing the performance monitoring facility about the starting of the backup operation, logic adapted for continuously evaluating performance of the database to determine when a predefined performance criterion is violated, and logic adapted for sending information from the performance monitoring facility to the data protection manager to cause compliance with the predefined performance criterion in response to the predefined performance criterion being violated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one embodiment, a background process is performed on a storage system which complies with a Service Level Agreement (SLA).

In another embodiment, a system is provided for performing a background process on a storage system which improves compliance with a SLA.

In one embodiment, a method comprises providing an interface between a performance monitoring facility of a database and a data protection manager, wherein the performance monitoring facility is adapted for measuring performance of the database regularly and the data protection manager is adapted for controlling a backup operation of the database on a storage subsystem, starting the backup operation while informing the performance monitoring facility about the starting of the backup operation, and continuously evaluating performance of the database while, when a predefined performance criterion is violated, sending information from the performance monitoring facility to the data protection manager to cause compliance with the predefined performance criterion.

Advantageously, in another embodiment, the backup operation may be regulated based on compliance with a predefined performance criterion, such as a SLA, associated with a foreground process. Violations of the SLA or other performance criterion may be caused by a backup operation or other effects, which may be determined by providing communication between the performance monitoring facility and the data protection manager. When the backup operation causes a violation, compliance with SLA or other performance criterion may be ensured by tuning the backup operation accordingly.

In an additional embodiment, the data protection manager may start and end backup operations and may inform the database and the performance monitoring facility about state changes in this process, particularly about entering and/or exiting backup mode, starting and/or ending a backup operation, starting and/or ending a background copy process, etc. Of course, other backup operations and state changes may be the basis for starting and/or ending backup operations and informing the database and the performance monitoring facility about state changes in the process, as would be understood by one of skill in the art upon reading the present descriptions.

In another embodiment, the backup operation may include a background copy process which starts with the backup operation, and the performance monitoring facility may be informed about the start of the backup operation and the start of the background copy process in the storage subsystem.

According to one preferred embodiment, the background copy process may start with the backup operation, and may inform the performance monitoring facility about starting of the backup operation and starting of the background copy process. Alternatively, the storage system may initiate the background copy process asynchronously.

According to another preferred embodiment, the data protection manager may ensure backup data consistency by informing the database when the backup operation starts and instructing the database to enter a backup mode.

In another approach, a copy rate of the background copy process of the backup operation may be reduced when the predefined performance criterion is violated. Furthermore, in some approaches, the method may further comprise determining when the predefined performance criterion is not violated, checking if it is possible to increase the copy rate, and increasing the copy rate when it is possible.

According to one approach, the data protection manager may create relationships between storage system source volumes and target volumes for the backup operation. Furthermore, where all source volumes and target volumes have established relationships, the data protection manager may inform the database to leave the backup mode. Upon leaving the backup mode, the storage subsystem may reassume data consistency responsibilities from the data protection manager and may ensure that copy operations are consistent, in some approaches. To ensure data consistency while exiting the backup mode, all copying may be temporarily suspended.

In further embodiments, the performance measurement facility may monitor performance data of the database, particularly wait times for input/output operations, and triggers adjustments to the copy rate of the background copy process in the storage subsystem. Of course, other performance data may be the basis for an adjustment of the copy rate, in further approaches.

According to another preferred embodiment, the performance measurement facility reduces the background copy rate when the predefined performance criterion is violated. Otherwise, the performance measurement facility increases the copy rate whenever possible.

In one exemplary embodiment, a computer program product may comprise a computer readable medium having computer readable program code therein. The computer readable program code may be configured to provide an interface between a performance monitoring facility of a database and a data protection manager, wherein the performance monitoring facility is adapted for measuring performance of the database regularly and the data protection manager is adapted for controlling a backup operation of the database on a storage subsystem, start the backup operation while informing the performance monitoring facility about the start of the backup operation and a start of a background copy process in the storage subsystem, and continuously evaluate performance of the database while, when a predefined performance criterion is violated, information is sent from the performance monitoring facility to the data protection manager to cause compliance with the predefined performance criterion.

In another exemplary embodiment, a system may include a performance monitoring facility of a database adapted for measuring performance of the database regularly, a data protection manager for controlling a backup operation of the database on a storage subsystem, logic adapted for providing an interface between the performance monitoring facility of the database and the data protection manager, logic adapted for starting the backup operation while informing the performance monitoring facility about the starting of the backup operation, and logic adapted for continuously evaluating performance of the database while, when a predefined performance criterion is violated, sending information from the performance monitoring facility to the data protection manager to cause compliance with the predefined performance criterion.

Referring now to the figures, FIG. 1 illustrates a system with a database 10, a storage subsystem 12, a data protection manager 30, and a performance monitoring facility 20 according to one embodiment. An interface 22, 32 is provided between the data protection manager 30 and the performance monitoring facility 20.

According to preferred embodiments, the performance monitoring facility 20 continuously measures the performance of the database 10. The interface 22, 32 allows a communication between the data protection manager 30 and the performance monitoring facility 20 so that the data protection manager 30 knows of background copy processes. Suitable action can be taken if a SLA or some other performance criterion is violated, e.g., by throttling the background copy process, if necessary. On the other hand, the background copy process may be intensified when the database 10 has available capacity with respect to the SLA or other performance criterion so that an increase of a wait time for read/write operations, i.e., input/output operations, due to the backup operation, may be tolerated.

Embodiments described herein may take the form of an entirely hardware embodiment, an entirely software embodiment, or an embodiment having both hardware and software elements. In a preferred embodiment, a software implementation may include, but is not limited to, firmware, resident software, microcode, etc.

Furthermore, embodiments described herein may take the form of a computer program product accessible from a computer readable medium having computer readable program code embodied therein for use by or in connection with a computer or any instruction execution system. For the purposes of this description, a computer-usable or computer readable medium may be any apparatus that can contain, store, communicate, propagate, and/or transport the computer readable program code for use by or in connection with the instruction execution system, apparatus, or device.

The medium may be an electronic, magnetic, optical, electromagnetic, infrared, or semiconductor system (or apparatus or device) or a propagation medium. Examples of a computer readable medium include a semiconductor memory, a solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code which may be retrieved from bulk storage during execution.

Input/output (I/O) devices (including, but not limited to keyboards, displays, pointing devices, etc.) may be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

Figure 2:
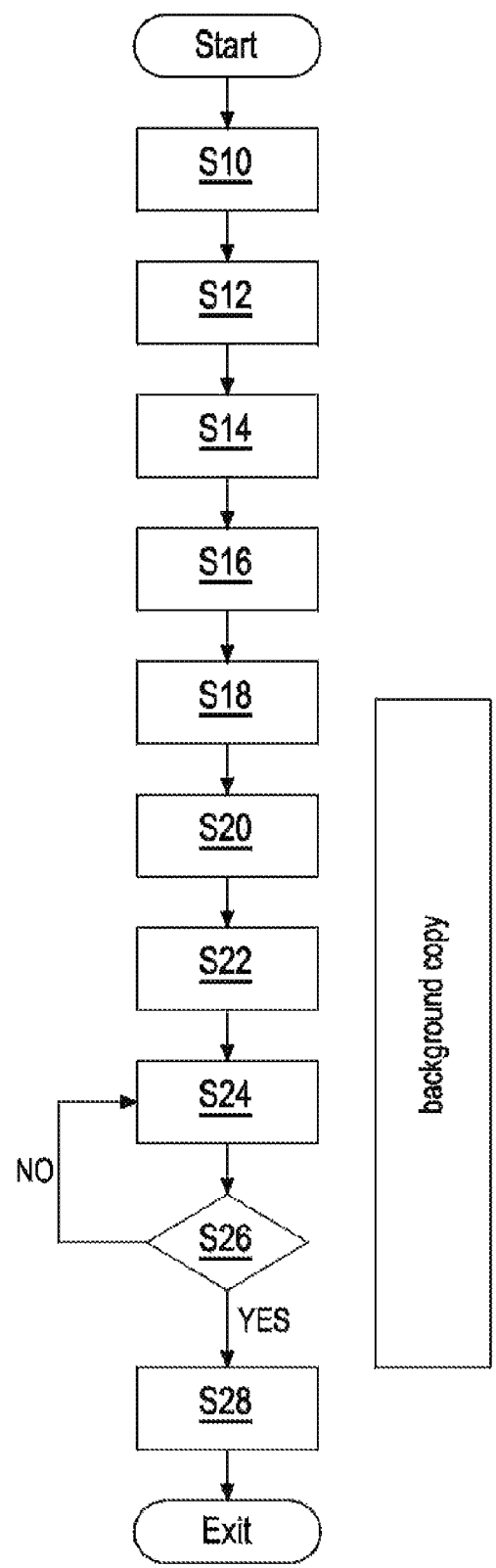
FIG. 2 shows a workflow of a data protection manager, according to one embodiment.

FIG. 2 depicts a flowchart illustrating a workflow of a data protection manager which is now possible due to the interface 22, 32 (as shown in FIG. 1) between the data protection manager 30 and the performance monitoring facility 20, according to one embodiment. In each of FIGS. 2 and 3, the workflow shown initiates on the provided interface 22, 32 (as shown in FIG. 1).

Referring again to FIG. 2, when a backup operation is started in step S10, e.g., a FlashCopy backup operation, via the data protection manager, the data protection manager sends a message to the performance monitoring facility and informs the performance monitoring facility about the start of the backup operation in step S12.

The data protection manager then informs the database which subsequently enters a backup mode in step S14. The data protection manager then interacts with the storage subsystem. In the storage subsystem, the relationships (mappings) between source volumes of the database and target volumes for the backup operation are created (step S16). Once these mappings have been created, a background copy process is started asynchronously by the storage system. This background copy process may be monitored by the data protection manager. The data protection manager informs the performance monitoring facility as soon as the background copy process is started that a background copy process acting on database source volumes is being performed (step S18). The data protection manager informs the database to leave the backup mode and the database leaves the backup mode in step S20. The backup from the point of view of the database finishes in step S22.

The meaning of "backup mode" is that the database ensures that the data included in the database is consistent at the time when the source-target relationships are generated (in a metaphorical way "taking a photo"). As soon as all necessary source-target relations are generated (the "photo" has been made), the database may leave the backup mode so that from the point of view of the database, the backup process has finished. Now the storage subsystem ensures that the copying of the data is done consistently, which is of no concern to the database. The copy is done independently in the storage subsystem and may take several hours, depending on the data volume. So whereas the data is still being copied over a long period of time, the backup has long been finished from the viewpoint of the database.

The monitoring of the background copy process is an ongoing task (step S24). As long as the background copy process is being performed (indicated by the vertical bar "background copy" in FIG. 2), which is checked in step S26, the background copy process is monitored by the data protection manager in step S24 as long as the background copy process is not finished (NO in FIG. 2). When the background copy process in the storage system has finished (YES in FIG. 2), this is recognized by the data protection manager. The performance monitoring facility is informed by the data protection manager about this event in step S28 and the workflow ends.

Figure 3:
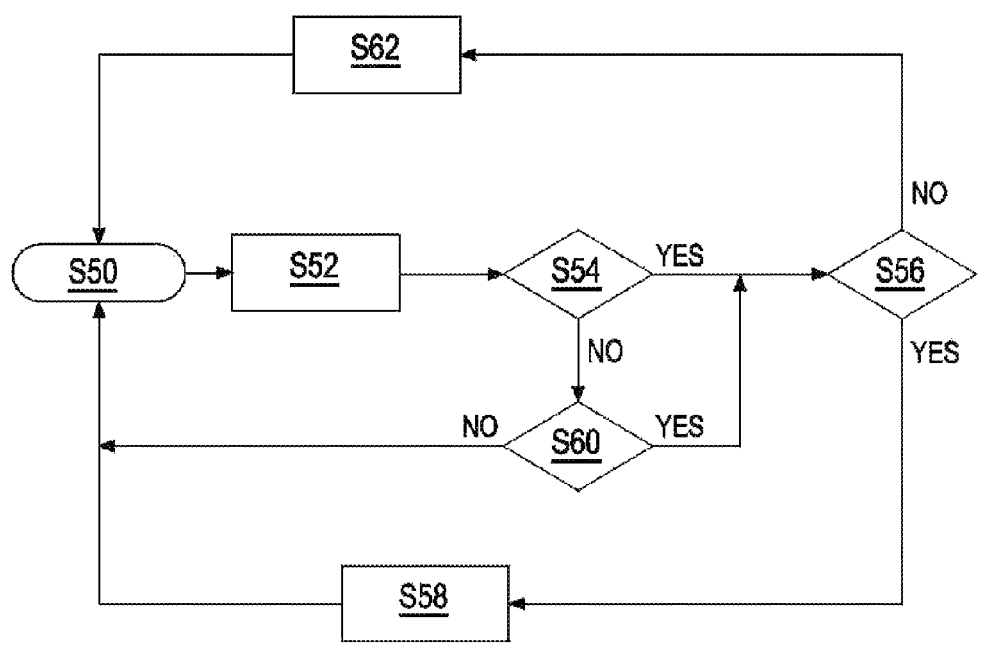
FIG. 3 shows a workflow of a data protection manager, according to one embodiment.

FIG. 3 depicts a flowchart illustrating the corresponding workflow of the performance monitoring facility which is now possible due to the interface 22, 32 (as shown in FIG. 1) provided between the data protection manager 30 and the performance monitoring facility 20, according to one embodiment.

Referring again to FIG. 3, after the start in step S50, the performance monitoring facility continuously measures the performance of the database and calculates relevant performance metrics in step S52, such as input/output wait time for the database.

An example for calculating write operations in a commercial database management system such as DB2 LUW database by IBM® is as follows. To compute write-related metrics using DB2 snapshot functionality, the following performance metrics may be collected from the DB2 system: (a) pool_write_time—time spent physically writing data or index pages from the buffer pool to disk, (b) pool_data_writes—number of times a buffer pool data page was physically written to disk, and (c) pool_index_writes—number of times a buffer pool index page was physically written to disk.

According to the DB2 documentation, the average physical write time may be computed as the ratio "pool_write_time/(sum over number of writes)." This value is continuously computed and monitored for increases in the average physical write time, according to one embodiment.

Based on such metrics, the performance monitoring facility can evaluate if a predefined performance criterion, such as a SLA, has been violated (step S54) or if the database is underutilized so that an increase of the copy rate may be performed without violating the predefined performance criterion.

If it is determined in step S54 that the predefined performance criterion is not violated (NO in FIG. 3), it is checked in step S60 if an increase in the copy rate is still within the predefined limits. If it is not (NO in FIG. 3), the workflow of the performance monitoring facility jumps back to the start step S50. If the copy rate is within the limits (YES in FIG. 3) and a background copy process is running which is determined in step S56, the performance monitoring facility informs the data protection manager to change the copy rate in the background copy process in step S58. The copy rate may be increased when the result in step S54 was that the predefined performance criterion is not violated. The copy rate may be decreased when the result in step S54 yields that the predefined performance criterion is violated. The workflow of the performance monitoring facility continues at the start step S50.

When it is determined in step S56 that no background copy process is running (NO in FIG. 3 at step S56), other actions may be taken in step S62 to establish compliance with the predefined performance criterion.

Due to the ongoing monitoring of the database performance, the result of the adjustment of the copy rate may be evaluated and further increase/decrease actions may by performed if necessary and/or desired.

The embodiments presented herein allow compliance if predetermined performance criteria during a FlashCopy backup of a database by enabling communication between a performance monitoring facility and a data protection manager. The performance monitoring facility triggers adjustments to the copy rate of the background copy process in the storage system while adhering to the predetermined performance criteria.

Further, software instructions to perform embodiments may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments may be devised, which do not depart from the scope of the invention as disclosed herein. Accordingly, the scope of the invention should be limited only by the attached claims.

It should also be noted that embodiments have been described with reference to different subject-matter. In particular, some embodiments have been described with reference to method type claims whereas other embodiments have been described with reference to apparatus type claims. However, a person skilled in the art may gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving information from a performance monitoring facility of a database at a data protection manager implemented at least in part in hardware, wherein the performance monitoring facility is configured to measure performance of the database, wherein the data protection manager is configured to control a backup operation of the database on a storage subsystem;
starting the backup operation and informing the performance monitoring facility about the starting of the backup operation;
in response to receiving an indication that a predefined performance criterion has been violated, receiving information from the performance monitoring facility at the data protection manager, the data protection manager causing compliance with the predefined performance criterion in response to the information.

2. The method according to claim 1, wherein the backup operation includes a background copy process which starts with the backup operation, and wherein the performance monitoring facility is informed about the start of the backup operation and the start of the background copy process in the storage subsystem.

3. The method according to claim 2, wherein a copy rate of the background copy process of the backup operation is reduced in response to determining that the predefined performance criterion is violated.

4. The method according to claim 3, comprising:
receiving an indication that the predefined performance criterion is not violated; and
increasing the copy rate in response to determining that the predefined performance criterion is not violated.

5. The method according to claim 2, comprising starting the background copy process asynchronously using the storage subsystem.

6. The method according to claim 2, wherein the data protection manager informs the performance monitoring facility when the background copy process is started.

7. The method according to claim 2, wherein the data protection manager informs the database when the backup operation is started to allow the database to enter a backup mode.

8. The method according to claim 7, wherein, the data protection manager informs the database to exit the backup mode in response to the background copy process ending.

9. The method according to claim 2, wherein the data protection manager informs the performance monitoring facility when the background copy process is finished.

10. The method according to claim 1, wherein the data protection manager interacts with the storage subsystem to create relationships between source volumes and target volumes for the backup operation.

11. A computer program product comprising a computer readable storage medium having program instructions embodied therewith, the program instructions being executable by a processor to cause the processor to:
provide, by the processor, an interface between a performance monitoring facility of a database and a data protection manager, wherein the performance monitoring facility is configured to measure performance of the database and the data protection manager is configured to control a backup operation of the database on a storage subsystem;
start, by the processor, the backup operation while informing the performance monitoring facility about the start of the backup operation;
send, by the processor, information from the performance monitoring facility to the data protection manager to cause compliance with a predefined performance criterion in response to determining that the predefined performance criterion being violated.

12. A method, comprising:
sending information from a performance monitoring facility of a database to a data protection manager, wherein the performance monitoring facility is implemented at least in part in hardware and is configured to measure performance of the database regularly and the data protection manager is configured to control a backup operation of the database on a storage subsystem;
receiving an indication at the performance monitoring facility about starting of the backup operation;
evaluating performance of the database to determine that a predefined performance criterion is violated; and
in response to determining that the predefined performance criterion is violated, sending information from the performance monitoring facility to the data protection manager to cause compliance with the predefined performance criterion.

13. The method according to claim 12, wherein the backup operation includes a background copy process which starts with the backup operation, and wherein the performance monitoring facility is informed about the start of the backup operation and the start of the background copy process in the storage subsystem.

14. The method according to claim 13, wherein a copy rate of the background copy process of the backup operation is reduced when the predefined performance criterion is violated.

15. The method according to claim 14, comprising:
determining when the predefined performance criterion is not violated, wherein the data protection manager increases the copy rate in response to determining that the predefined performance criterion is not violated.

16. The method according to claim 13, wherein the background copy process is started asynchronously using the storage subsystem.

17. The method according to claim 13, wherein the data protection manager informs the performance monitoring facility when the background copy process is started.

18. The method according to claim 13, wherein the data protection manager informs the database when the backup operation is started to allow the database to enter a backup mode.

19. The method according to claim 18, wherein the data protection manager informs the database to exit the backup mode in response to the background copy process ending.

20. The method according to claim 13, wherein the data protection manager informs the performance monitoring facility when the background copy process is finished.

\* \* \* \* \*